US006246395B1

(12) United States Patent
Goyins et al.

(10) Patent No.: US 6,246,395 B1
(45) Date of Patent: Jun. 12, 2001

(54) PALM PRESSURE REJECTION METHOD AND APPARATUS FOR TOUCHSCREENS

(75) Inventors: Gregg S. Goyins; Mark F. Resman, both of Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/215,048

(22) Filed: Dec. 17, 1998

(51) Int. Cl.$^7$ .................................................. G09G 5/00
(52) U.S. Cl. ................................. 345/173; 345/179
(58) Field of Search ..................... 345/173, 174, 345/175, 177, 179, 180, 156, 157; 178/18.01–18.11, 19.01–19.05; 341/22

(56) References Cited

U.S. PATENT DOCUMENTS

| | | | | |
|---|---|---|---|---|
| 4,914,624 | * | 4/1990 | Dunthorn | 345/173 |
| 5,589,856 | * | 12/1996 | Stein et al. | 345/173 |
| 5,748,185 | * | 5/1998 | Stephan et al. | 345/173 |
| 5,764,222 |   | 6/1998 | Shieh | 345/173 |
| 5,825,352 | * | 10/1998 | Bisset et al. | 345/157 |
| 5,943,043 | * | 8/1999 | Furuhata et al. | 345/173 |

* cited by examiner

Primary Examiner—Dennis-Doon Chow

(57) ABSTRACT

There is provided a method and apparatus for categorizing substantially simultaneous inputs to a touchscreen. The method is described within a computer device having a display screen adapted to receive touchscreen input. In a first step, the display screen is divided into a plurality of sectors. Next, the sectors are sequentially scanned for input. When a plurality of substantially simultaneous inputs are sensed in respective sectors, the location by sector of each input is ascertained. A unique value is then assigned to each input received, the assigned values corresponding to the sequence in time of the respective inputs based upon the sequentially scanned sectors in which the inputs occurred. The apparatus includes a display screen adapted to receive touchscreen input. A touchscreen driver/sensor is provided to divide the display screen into a plurality of sectors and to sense input in each of the sectors. A sequence counter is used to actuate the driver/sensor to scan the display screen sectors sequentially and at predetermined intervals for input, and to assign a unique value to each input received.

20 Claims, 2 Drawing Sheets

PALM PRESSURE REJECTION METHOD AND APPARATUS FOR TOUCHSCREENS

FIELD OF THE INVENTION

This invention relates to the field of graphical user interface (GUI) systems employing touchscreens. More specifically, this invention relates to methods and apparatus for interpreting touchscreen inputs.

BACKGROUND OF THE INVENTION

Touchscreen computer interfaces are today present in virtually every place, public and private. Found in such diverse devices as hand-held computers and informational kiosks, touchscreens help everyone from scientists to tourists to input and extract electronically stored information. Touchscreens allow a computer user's finger or stylus to act as an input device, making them extremely useful in applications where a mouse or keyboard would be either impractical or impossible.

Just as the general public intuitively grasps the operation of touchscreens from a user's standpoint, those of skill in the art will similarly recognize the basic operational technology underlying touchscreen interfaces, and how touchscreen device drivers communicate with operating systems. Known touchscreens use various physical or electrical attributes of the screen to sense inputs. Among these are resistance, capacitance, temperature, pressure, vibration, and motion. Programs to implement a graphical user interface (GUI) and operating system are provided in the central processing unit of the computer device with which the touchscreen is associated. These programs typically include a device driver that allows the user to perform such functions as selecting and opening files, moving icons, and inputting commands and other data through the display screen of the computer itself. The allowed inputs are usually similar to those that can be accomplished with a mouse or other standard input device.

Although touchscreen inputs and standard input device inputs are similar in some respects, there are significant practical differences. For example, in systems using a conventional input device such a mouse, there is typically only one port or conduit through which the kind of input expected may be received. For example, since there is usually only one mouse associated with a PC, all point-and-click input comes from the mouse. There is little to no chance of confusing mouse input with input from other sources.

Unfortunately, such confusion is almost ubiquitous in most touchscreen applications. Known touchscreen devices have no way of discriminating in time and space between palm and finger, or stylus and thumb, as they touch the screen in combination. This is due to the fact that, in typical touchscreen applications, it is impossible to effectively distinguish between multiple, simultaneous activation points on the touchscreen. Thus it often occurs, especially in large-format touchscreens, that unintended inputs result from, for example, a palm resting on the touchscreen surface in conjunction with a stylus applied to the touchscreen.

There have been attempts in the art to distinguish, in limited ways, between various types of screen touches. One such an attempt may be seen in U.S. Pat. No. 5,764,222 to Shieh, which describes a "method, apparatus, and article of manufacture" creating a "virtual pointing device" on a touchscreen. This patent suggests using the touchscreen to measure various dimensions of a user's hand, then recording these measurements. The computer can then be programmed to assign a function to a touch from each of the respective hand portions of a measured user. The computer keeps a database of each user's unique measurements, as well as a "default" file representing a "generic" set of measurements.

Although this patent suggests a way to distinguish between and among some types of screen touches, it does not address the problem of classifying or characterizing these inputs when they are made substantially simultaneously. Nor is the described system practical for applications used by a wide cross-section of individuals in public places, such a kiosks or ATM's. More importantly, there is no provision made for those instances in which two fingertips, or a stylus and a knuckle, of the user hit the screen at about the same time. Thus, the computer may respond in a way that the user did not intend, or fail to respond at all.

It is apparent from the foregoing that the need exists for a simple and efficient touchscreen operational arrangement that will facilitate touchscreen use by effectively distinguishing between multiple, simultaneous activation points on the touchscreen.

SUMMARY OF THE INVENTION

In order to accomplish the present invention, there is provided a method for categorizing substantially simultaneous inputs to a touchscreen. The method may be practiced in the context of a computer device having a display screen adapted to receive touchscreen input. In a first step, the display screen is divided into a plurality of sectors. Next, the sectors are sequentially scanned for input. When a plurality of substantially simultaneous inputs are sensed in respective sectors, the location by sector of each input is ascertained. A unique value is then assigned to each input received, the assigned values corresponding to the sequence in time of the respective inputs based upon the sequentially scanned sectors in which the inputs occurred.

The computer device can include a touchscreen driver/sensor adapted and constructed to sequentially drive and sense discrete sectors of the display screen. The driver/sensor can be used to divide the screen into a plurality of sectors.

The driver/sensor can be used to divide the screen into sectors of any desirable number, size, or shape. For example, the sectors can be of substantially equal area, substantially rectilinear sectors, quadrants, sectors having substantially unequal area, or into substantially non-rectilinear sectors.

A sequence counter can be used to assign a time value to each input, and to actuate the driver/sensor to sequentially scan discrete sectors of the display screen at predetermined regular intervals.

Also provided is an apparatus for categorizing substantially simultaneous inputs to a touchscreen. The apparatus includes a display screen adapted to receive touchscreen input. A touchscreen driver/sensor is provided to divide the display screen into a plurality of sectors and to sense input in each of the sectors. A sequence counter is used to actuate the driver/sensor to scan the display screen sectors sequentially and at predetermined intervals for input, and to assign a unique value to each input received.

As with the previous embodiment, the driver/sensor can be used to divide the screen into sectors of any desirable number, size, or shape.

The apparatus can also include a processor adapted and constructed to receive input sector location data from the driver/sensor and input time sequence data from the sequence counter, and to manipulate the location and time sequence data for the inputs to classify the inputs. The driver/sensor can be provided as a multi-channel driver sensor, with the number of channels corresponding to the number of sectors into which the display screen is divided. A multi-channel analog demultiplexer can be connected to the driver/sensor. An analog-to-digital converter can be connected to the demultiplexer. The sequence counter is then connected to the driver/sensor and the demultiplexer such that the sequence counter controls actuation of the driver/sensor and the demultiplexer.

BRIEF DESCRIPTION OF THE DRAWINGS

A better understanding of the invention may be had from the consideration of the following detailed description taken in conjunction with the accompanying drawings, in which.

DETAILED DESCRIPTION OF THE INVENTION

Figure 1:
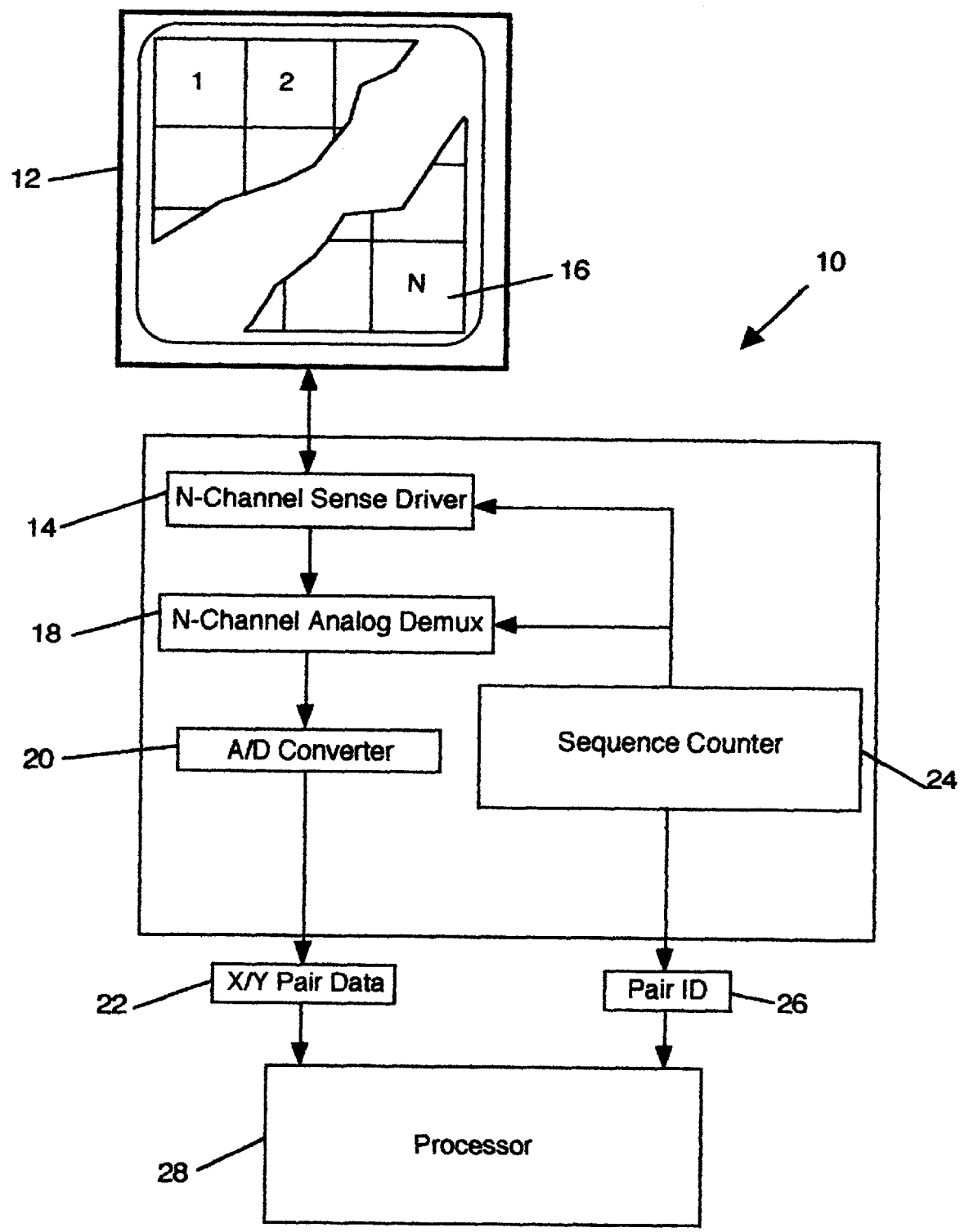
FIG. 1 is a schematic view of a preferred embodiment of the present invention.

The present invention is not limited to a specific embodiment illustrated herein. FIG. 1 illustrates an apparatus 10 for categorizing substantially simultaneous inputs to a touchscreen. The apparatus includes a display screen 12 adapted to receive touchscreen input. A touchscreen driver/sensor 14 is provided to divide the display screen 12 into a plurality of sectors 16. The basic structure of the driver/sensor 14 is similar to that known in the art for driving and sensing in touchscreen applications. However, the software component of the driver/sensor 14 has been rewritten to create a virtual multi-channel sensor/driver that divides the display screen 12 into sectors 16, and is then capable of driving electrical energy to, and sensing input from, each of the sectors 16. For example, the driver/sensor 14 can be programmed such that it has a number of channels corresponding to the number of sectors 16 into which the display screen 12 is divided. Such programming will necessarily vary with the particular type and manufacturer of each touchscreen configuration, and is well within the purview of a programmer of ordinary skill in the art of touchscreen system design.

Output from each channel of the driver/sensor 14 is fed into a respective input of a multi-channel analog demultiplexer 18. Output from the driver/sensor 14 is in the form of signals representing the X and Y coordinates and the sector for a touchscreen input. The demultiplexer 18 receives these signals, and outputs a single analog signal representing the spatial location by sector of the input.

The analog signal of the demultiplexer 18 is fed into an analog-to-digital converter 20. The analog-to-digital converter 20 takes the analog signal from the demultiplexer 18 and translates it to a digital output 22 representing X-Y pair data, i.e., the sector location of the analog signal representing the input received.

A sequence counter 24 is provided, and has outputs connected respectively to the driver/sensor 14 and to the demultiplexer 18. The sequence counter 24 actuates the driver/sensor 14 to scan the display screen sectors sequentially, and at predetermined intervals, to detect potential input. The output of the sequence counter 24 to the demultiplexer 18 ensures that the driver/sensor 14 and the demultiplexer 18 are advanced to corresponding channels.

Output from the sequence counter 24 is also used to generate a "Pair ID" 26, which is a unique value assigned to each input received. The Pair ID of an input indicates the sequence in time in which the input was scanned in by the driver/sensor 14.

The apparatus 10 includes a processor 28 adapted and constructed to receive as its inputs both the digital location output 22 and the time sequence Pair ID 26. The processor can then perform any desired heuristic to manipulate the information contained in the location output 22 and the time sequence Pair ID 26 to classify the inputs. For example, the processor 28 may be programmed to ignore input from specific sectors where there are no meaningful user-selectable options offered. In another example, the processor 28 might be programmed to interpret a plurality of inputs in the same sector as representing pressure from a user's palm. If the plurality of inputs is closely followed in time by a single input in a significant area (i.e., one that the processor has not been programmed to ignore), the processor could interpret this single input as an intentional user selection, and respond accordingly.

Figure 2:
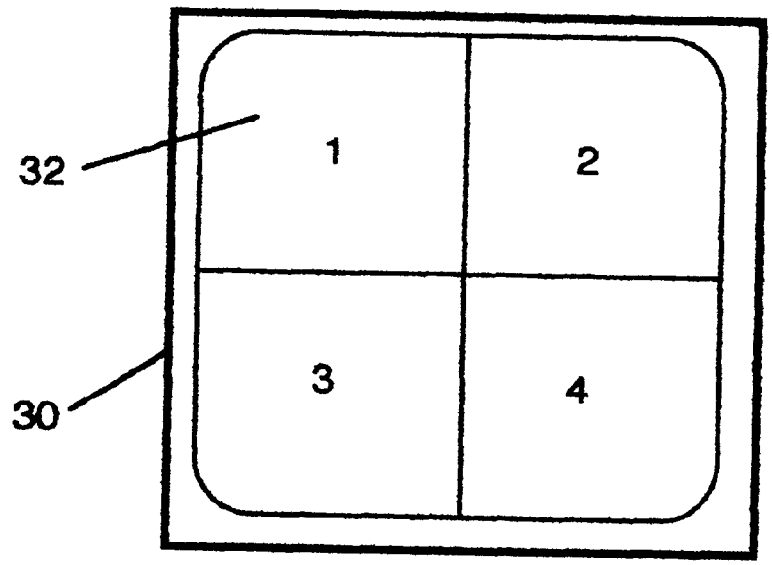
FIG. 2 is a schematic view of a first alternative configuration of a display screen.
Figure 3:
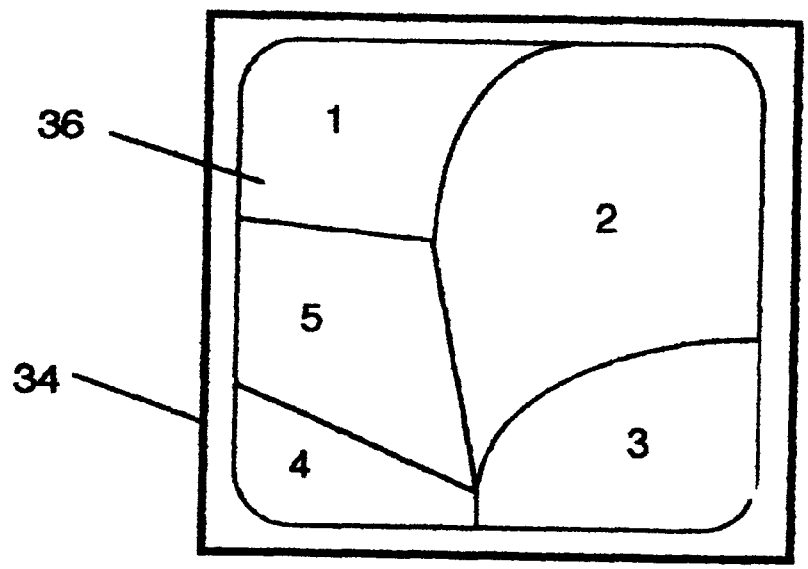
FIG. 3 is a schematic view of a second alternative configuration of a display screen.

The driver/sensor 14 can be used to divide the display screen into sectors of any desirable number, size, or shape. FIG. 2 illustrates an example of a display screen 30 divided into sectors 32 that are rectilinear quadrants having substantially equal area. By contrast, FIG. 3 illustrates an example of a display screen 34 divided into sectors 36 that are non-rectilinear and have substantially unequal area. It is contemplated that the desirable size and shape of sectors will depend upon the specific application for which the touchscreen is intended.

The present invention is applicable to any known touchscreen using various physical or electrical attributes of the screen to sense inputs, for example, resistance, capacitance, temperature, pressure, vibration, and motion. That the present invention is described with reference to a system in which the touchscreen sectors are driven by voltage sources is not intended to be limiting.

Although the preferred embodiment of the present invention has been illustrated, and that form described, it is readily apparent to those skilled in the art that various modifications may be made therein without departing from the spirit of the invention, or form the scope of the appended claims.

What is claimed is:

1. In a computer device having a display screen adapted to receive touchscreen input, a method for categorizing substantially simultaneous inputs to a touchscreen comprising the following steps:

dividing the display screen into a plurality of sectors;

scanning the sectors sequentially for input;

sensing a plurality of substantially simultaneous inputs in respective sectors;

ascertaining the location by sector of each input; and assigning a value to each input received, the assigned values corresponding to the sequence in time of the respective inputs based upon the sequentially scanned sectors in which the inputs occurred;

whereby the assigned values are compared to distinguish functionally significant inputs from inadvertent inputs.

2. A method according to claim 1, wherein the computer device comprises a touchscreen driver/sensor adapted and constructed to sequentially drive and sense discrete sectors of the display screen, and the step of dividing the screen into a plurality of sectors comprises actuating the driver/sensor to divide the display screen into sectors.

3. A method according to claim 2, wherein the step of dividing the screen into a plurality of sectors comprises actuating the driver/sensor to divide the display screen into sectors having substantially equal area.

4. A method according to claim 3, wherein the step of dividing the screen into a plurality of sectors comprises dividing the display screen into substantially rectilinear sectors.

5. A method according to claim 4, wherein the step of dividing the display screen into a plurality of sectors comprises actuating the driver/sensor to divide the display screen into quadrants.

6. A method according to claim 1, wherein the step of dividing the display screen into a plurality of sectors comprises actuating the driver/sensor to divide the display screen into sectors having substantially unequal area.

7. A method according to claim 1, wherein the step of dividing the screen into a plurality of sectors comprises actuating the driver/sensor to divide the display screen into substantially non-rectilinear sectors.

8. A method according to claim 1, wherein the step of assigning values to inputs received comprises using a sequence counter to assign a time value to each input.

9. A method according to claim 1, wherein the computer device comprises a touchscreen driver/sensor adapted and constructed to sequentially drive and sense discrete sectors of the display screen, and the step of scanning sectors sequentially for input comprises causing a sequence counter to actuate the driver/sensor to sequentially scan discrete sectors of the display screen at predetermined regular intervals.

10. An apparatus for categorizing substantially simultaneous inputs to a touchscreen, the apparatus comprising the following:

a display screen adapted to receive touchscreen input;

a touchscreen driver/sensor adapted and constructed to divide the display screen into a plurality of sectors and to sense input in each of the sectors; and a sequence counter adapted and constructed to actuate the driver/sensor to scan the display screen sectors sequentially and at predetermined intervals for input, and to assign a unique value to each input received;

whereby the assigned values are compared to distinguish functionally significant inputs from inadvertent inputs.

11. An apparatus according to claim 10, wherein the driver/sensor is adapted and constructed to divide the display screen into sectors having substantially equal area.

12. An apparatus according to claim 11, wherein the driver/sensor is adapted and constructed to divide the display screen into a plurality of substantially rectilinear sectors.

13. An apparatus according to claim 12, wherein the driver/sensor is adapted and constructed to divide the display screen into quadrants.

14. An apparatus according to claim 10, wherein the driver/sensor is adapted and constructed to divide the display screen into sectors having substantially unequal area.

15. An apparatus according to claim 10, wherein the driver/sensor is adapted and constructed to divide the display screen into substantially non-rectilinear sectors.

16. An apparatus for categorizing substantially simultaneous inputs to a touchscreen, the apparatus comprising the following:

a display screen adapted to receive touchscreen input;

a touchscreen driver/sensor adapted and constructed to divide the display screen into a plurality of sectors and to sense input in each of the sectors;

a sequence counter adapted and constructed to actuate the driver/sensor to scan the display screen sectors sequentially and at predetermined intervals for input, and to assign a unique value to each input received; and a processor adapted and constructed to receive input sector location data from the driver/sensor and input time sequence data from the sequence counter, and to manipulate the location and time sequence data for the inputs to classify the inputs;

whereby the manipulation of data by the processor distinguishes functionally significant inputs from inadvertent inputs.

17. An apparatus according to claim 16, wherein the touchscreen driver/sensor comprises a multi-channel driver sensor, with the number of channels corresponding to the number of sectors into which the display screen is divided.

18. An apparatus according to claim 16, further comprising:

a multi-channel analog demultiplexer connected to the driver/sensor.

19. An apparatus according to claim 17, further comprising:

an analog-to-digital converter connected to the demultiplexer.

20. An apparatus according to claim 16, wherein the sequence counter is connected to the driver/sensor and the demultiplexer such that the sequence counter controls actuation of the driver/sensor and the demultiplexer.

* * * * *